US005921670A

United States Patent [19]

Schumacher et al.

[11] Patent Number: 5,921,670

[45] Date of Patent: Jul. 13, 1999

[54] LIGHTING SYSTEM FOR A PASSENGER CABIN ESPECIALLY IN AN AIRCRAFT

[75] Inventors: Markus Schumacher; Andrew Muin, both of Buxtehude; Michael Lau, Dollern, all of Germany

[73] Assignee: Daimler-Benz Aerospace Airbus GmbH, Hamburg, Germany

[21] Appl. No.: 08/820,641

[22] Filed: Mar. 14, 1997

[30] Foreign Application Priority Data

Mar. 15, 1996 [DE] Germany .......................... 196 10 147

[51] Int. Cl.[6] ................................ B60Q 3/02; G02B 6/26

[52] U.S. Cl. .......................... 362/480; 362/277; 362/286; 362/294; 362/319; 362/418; 362/471; 362/580; 385/25

[58] Field of Search ............................... 385/25, 31, 147; 362/96, 277, 285, 286, 294, 319, 391, 418, 551, 580, 224, 225, 470, 471, 479, 480, 483, 484

[56] References Cited

U.S. PATENT DOCUMENTS

| | | | |
|---|---|---|---|
| 2,198,579 | 4/1940 | Mayer | 362/479 |
| 4,740,048 | 4/1988 | Mori | 385/25 |
| 4,941,074 | 7/1990 | DeCosse et al. | 362/511 |
| 5,113,322 | 5/1992 | Mikalonis | 362/479 |
| 5,129,597 | 7/1992 | Manthey et al. | 362/471 |
| 5,325,272 | 6/1994 | Miller | 362/554 |
| 5,422,794 | 6/1995 | Drake | 362/471 |
| 5,483,427 | 1/1996 | Dealey, Jr. et al. | 362/485 |
| 5,558,425 | 9/1996 | Pons et al. | 362/490 |
| 5,647,658 | 7/1997 | Ziadi | 362/471 |
| 5,651,733 | 7/1997 | Schumacher | 362/471 |

*Primary Examiner*—Alan Cariaso
*Attorney, Agent, or Firm*—W. F. Fasse; W. G. Fasse

[57] ABSTRACT

A lighting system for passenger cabins, particularly aircraft passenger cabins, is equipped with at least one central light source cooperating with hollow light guides for distributing light in the passenger cabin. The light sources may be positioned in fixed locations within the aircraft or in fixed locations in the ceiling or in mobile locations within the hollow light guides. Light extractors are positioned where needed. The light guides are hollow preferably tubular light guides which may cooperate with optical light conductor fibers, and with lenses and mirrors where needed.

24 Claims, 8 Drawing Sheets

43
44
45
45A
45B
46
47
48A
48B
48C
49
LA
LIA
50
50'
51
51'
51"
52
52'
53
55
56
60
60'
62
63
CAF
L

LIGHTING SYSTEM FOR A PASSENGER CABIN ESPECIALLY IN AN AIRCRAFT

FIELD OF THE INVENTION

The invention relates to a lighting system for a passenger cabin especially in an aircraft for satisfying general lighting requirements for commonly lit areas and individual lighting requirements for passenger seats.

BACKGROUND INFORMATION

Lighting systems for passenger cabins in aircraft are well known, whereby different lighting requirements in different areas of the cabin must be satisfied by a multitude of different lighting installations and different lighting fixtures. Lighting fixtures with fluorescent light tubes are installed primarily in the ceiling above the luggage compartments for general illumination. Fluorescent light tubes are also used for indirect illumination of coffered ceiling sections of the aircraft cabin. Similarly, it is known to use fluorescent light tubes in the entrance area of an aircraft where the fluorescent light tubes are arranged directly in the ceiling area behind a transparent cover. In addition to the just mentioned lighting devices for general illumination there are individualized lighting devices or fixtures for individually illuminating each seat, for example by reading lamps normally arranged below the luggage compartments in a passenger service unit, one of which is provided for each group of seats. Both, lighting fixtures for general illumination and lighting fixtures for individual illumination require for their operation additional units such as transformers, ballast devices, switches, and electrical wiring. These components taken together accumulate a substantial weight that cannot be ignored. Additionally, conventional lighting systems require a high maintenance and repair effort and expense, for example due to the need for replacement of defective incandescent light bulbs and/or fluorescent light tubes and various other components of conventional lighting systems.

OBJECTS OF THE INVENTION

In view of the above it is the aim of the invention to achieve the following objects singly or in combination:

- to provide a lighting system for an aircraft which integrates a plurality of illumination requirements in an aircraft passenger cabin into a uniform system;
- to provide a lighting system with a minimum of light sources, the light of which is distributed in accordance with particular illumination requirements;
- to substantially reduce the weight of the entire lighting system in an aircraft;
- to make the aircraft lighting system highly reliable while still reducing the effort and expense for maintenance, replacement and repair work;
- to provide a lighting system that is easily adapted to perform special illumination tasks for different cabin areas;
- to facilitate the general illuminating of common areas in the passenger cabin as well as the individual illumination of the passenger seat areas;
- to provide a lighting system that is particular amenable for modular construction; and
- to provide a flexible control for changing the illumination for different cabin sections in accordance with varying requirements.

SUMMARY OF THE INVENTION

The above objects have been achieved according to the invention by a passenger cabin lighting system wherein at least one central light source is arranged for cooperation with a plurality of light distribution hollow light conductors installed in the passenger cabin. The hollow light distribution conductors are referred to herein as light guides in analogy to wave guides and may include light conductors, such as light conducting pipes and tubes, which may additionally cooperate with optical fibers.

It is an advantage of the invention that the hollow light guides provide a uniform light distribution and illumination system for general and individual illumination areas within the passenger cabin. The system also results in a substantial weight reduction compared to the above described conventional systems because the use of electrical cables, ballast devices, lighting fixtures and the number of light sources has been minimized. The light guides and their light distributing or extracting elements have eliminated numerous conventional light sources that were necessary heretofore. It is now possible to arrange light sources where they are most easily accessible within the passenger cabin. The light distribution from a central source or central sources through the hollow light guides is efficient and can be efficiently controlled in accordance with individual illumination requirements.

The present system can provide floodlighting of special cabin areas including display signs and the like without the need for individual floodlight sources.

Further, various general lighting requirements for common areas can be realized with a multitude of variations with little effort and expense, whereby light sources can be installed at easily accessible locations and the number and lengths of electrical cables are greatly reduced.

Similarly, the present system is highly amenable to a modular construction, whereby the hollow light guides such as light conducting tubes or pipes permit installing the required light sources at easily accessible locations within the aircraft cabin thereby also reducing the requirement for electrical cables.

The individual illumination of passenger seat areas is also greatly facilitated by the present system because light can be withdrawn from the hollow light guides in various ways adaptable to the particular seating arrangement. Furthermore, the present system and its individual components are flexibly controllable for changing the illuminating conditions for different cabin areas or sections.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
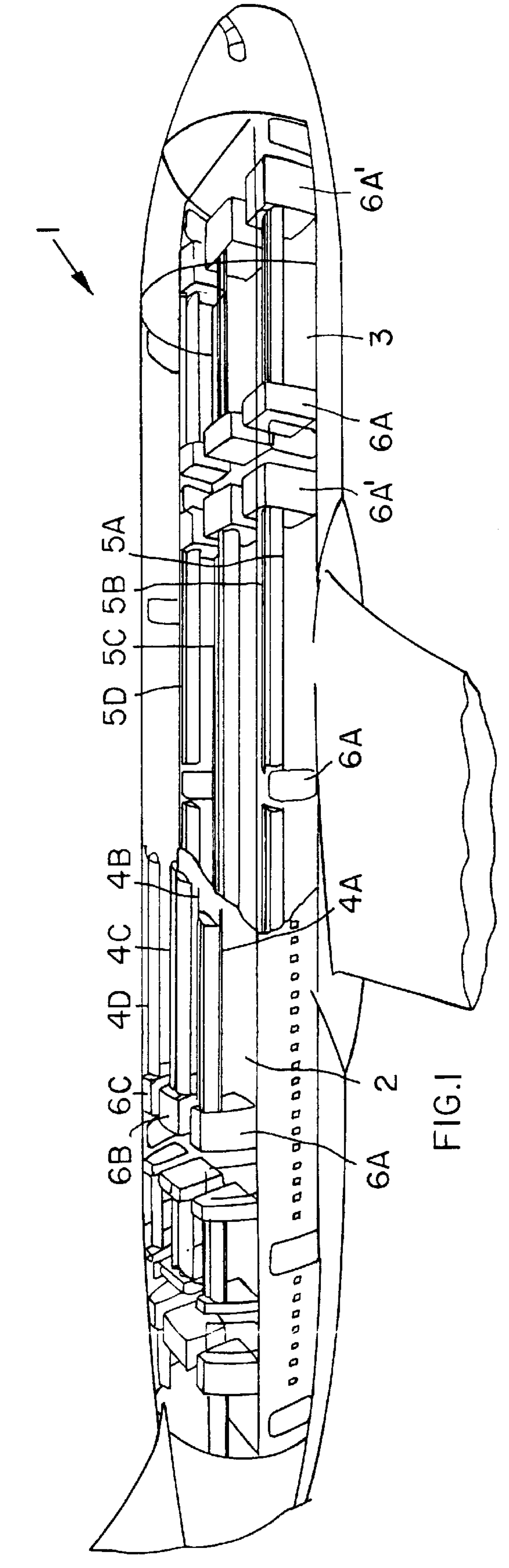
FIG. 1 shows a passenger aircraft with body wall portions removed for showing the basic layout of the present lighting system.

FIG. 1 shows an aircraft 1 having an upper deck 2 and a lower deck 3. Passenger cabins are provided in both decks. Hollow light guides 4A, 4B, 4C, 4D and 5A, 5B, 5C, and 5D are arranged in these upper and lower cabins. These light guides extend substantially along the entire cabin length for light distribution. The light guides are constructed as hollow light conductor sections, preferably hollow tubular sections which receive their light input from a light source. These light sources are preferably installed in built-in aircraft cabin components such as cabinets in on-board galleys or in cabin separation walls. The built-in aircraft components are, for example, shown in FIG. 1 at 6A, 6B, and 6C. The hollow light sources are arranged to feed light into the light guides which conduct the light in the hollow tubular space of these light guides. A portion of the light is internally reflected in the light guides and a further portion of the light can exit from the light guide. The exiting light is then used for cabin illumination purposes.

Figure 2:
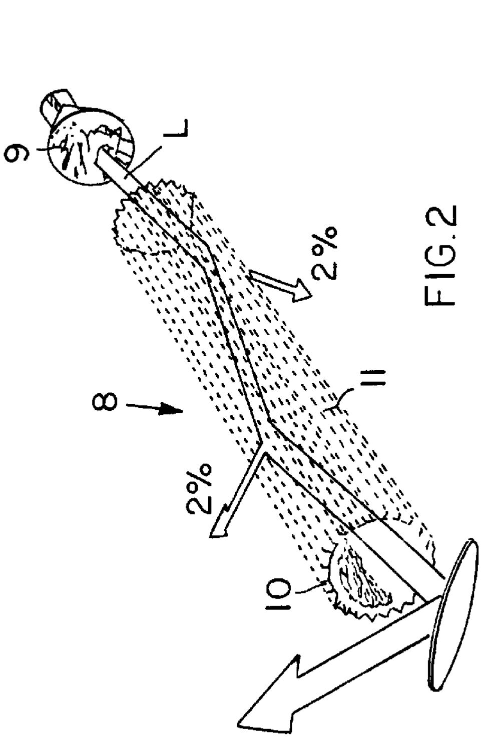
FIG. 2 shows a perspective view of the construction of a hollow light guide used in the present system.

FIG. 2 shows one embodiment of a hollow light conductor referred to herein simply as light guide 8. The light guide 8 may be made of glass or clear synthetic material. Light L from a light source 9 is radiated into one end of the light guide 8. The interior of the light guide 8 is covered with an optical lighting film 10 known as OLF. The optical lighting film 10 reflects light back into the interior of the light guide. The optical lighting film 10 is so positioned or rolled into the interior of the light guide 8 that the smooth surface of the film faces radially inwardly while longitudinal outwardly facing grooves 11 face radially outwardly. Instead of using a tubular envelope with an optical lighting film 10 inside, it is possible to use a light guide which is a single hollow component, the interior surface of which is itself formed as a prismatic type of reflection surface. The predominant proportion of the light inside the light guide 8, for example 98% relative to a light guide of limited axial length, is guided inside the light guide 8 while a substantially smaller proportion about 2% is not reflected back into the light guide due to its angle of incidence on the inner surface of the light guide 8. This 2% of light proportion that is not reflected back into the light guide exits through the light guide wall and provides the required cabin lighting or illumination. Such a light guide is suitable for illuminating common areas inside the cabin, such as aisles, ceilings, toilets and the like.

The light guide diameter and the light output of the light sources are so dimensioned for use in an aircraft cabin that not only the light guide itself, but also the cabins 2 and 3 are uniformly illuminated to the required brightness or illumination level. The light guide is to be installed with a length extending preferably from one cabin installation 6A to another cabin installation 6A' as shown in FIG. 1 in order to illuminate uninterrupted cabin sections without an interruption in the illumination. In smaller aircraft having but one longitudinal aisle, it is advantageous to install but one light guide extending over the entire cabin length having due regard to the cabin layout. In such a single light guide system it is advantageous to provide a light source at each end of the light guide to feed sufficient light energy into the light guide in order to provide a sufficient illumination level along the entire length of the cabin.

Light guides equipped with optical lighting film 10 are combined according to the invention with various light extractors for increasing the decoupling of light out of the light guide. A focussed light decoupling is suitable for locations having an increased illumination level requirement, for example, information panels, stairways between the decks, doors and similar locations within the cabin require an illumination level higher than the general illumination level in the cabin. Depending on how many light decouplings are required for a particular purpose, it may be necessary for achieving a uniform illumination to provide a plurality of light sources at a relatively short distance from each other along the light guide.

Figure 3A:
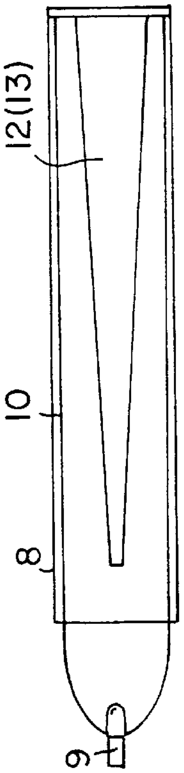
FIGS. 3 and 3A show a side view and a top plan view of a hollow light guide with a light extractor.
Figure 3:
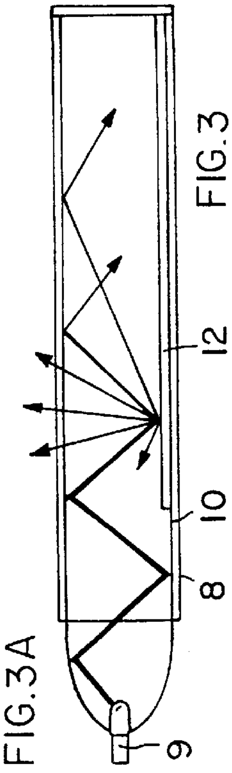

FIGS. 3 to 6 illustrate various methods and devices for decoupling or extracting light out of the hollow light guides. In FIG. 3 the light guide 8 covered on its inner surface with an optical lighting film 10 is provided with a light extractor 12 made of a white diffuse, scattering film 13 having a high degree of reflection. Thus, the film 13 functions as a reflection film which makes sure that a portion of the light passing through the light guide 8 is scattered at angles of incidence smaller than the incidence angle for total reflection. The optical lighting film 10 is transparent for light incident at these nonreflecting angles of incidence. Thus, light L coming from a light source 9 can, following reflection at the light extractor 12 pass through the jacket of the light guide 8 in the directions shown in FIG. 3. In order to assure that a uniform light extraction is accomplished along the length of the light guide 8, the width of the extractor 12 shown in FIG. 3A increases with its distance from the light source 9, whereby any decrease in the decoupled light quantity further away from the light source is compensated. Thus, a tip of the extractor 12 is positioned near the light source 9 while its wide end is positioned away from the light source 9.

Figure 4:
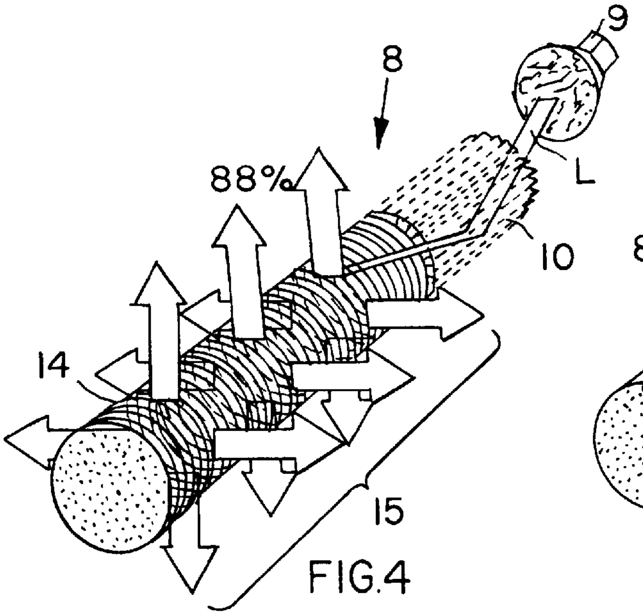
FIGS. 4 and 5 show hollow light guides with different light extractors.

FIG. 4 illustrates another embodiment for efficiently decoupling light at selected positions along the length of the light guide 8. In FIG. 4 a portion of the optical lighting film 10 along a light guide length 15 has been replaced by transmission right-angle film (TRAF) arranged as radially extending elements through which light can exit as indicated by the large arrows in FIG. 4. These arrows representing light show that the light exits at right angles to the longitudinal central axis of the light guide 8. These radially extending elements actually are rings of TRAF on the inside of the light guide 8.

Figure 5:
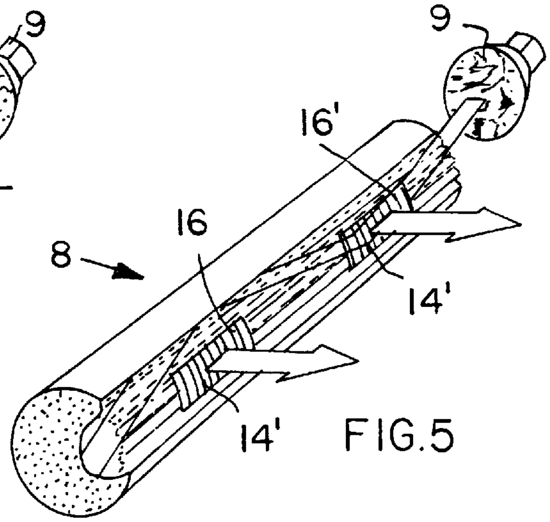

FIG. 5 shows a light guide 8 in which radially extending sectors 14' of transmission right angle film are positioned at determined light exit openings 16 and 16'. These openings form windows through which defined cabin areas can be illuminated or event floodlighted.

Figure 6:
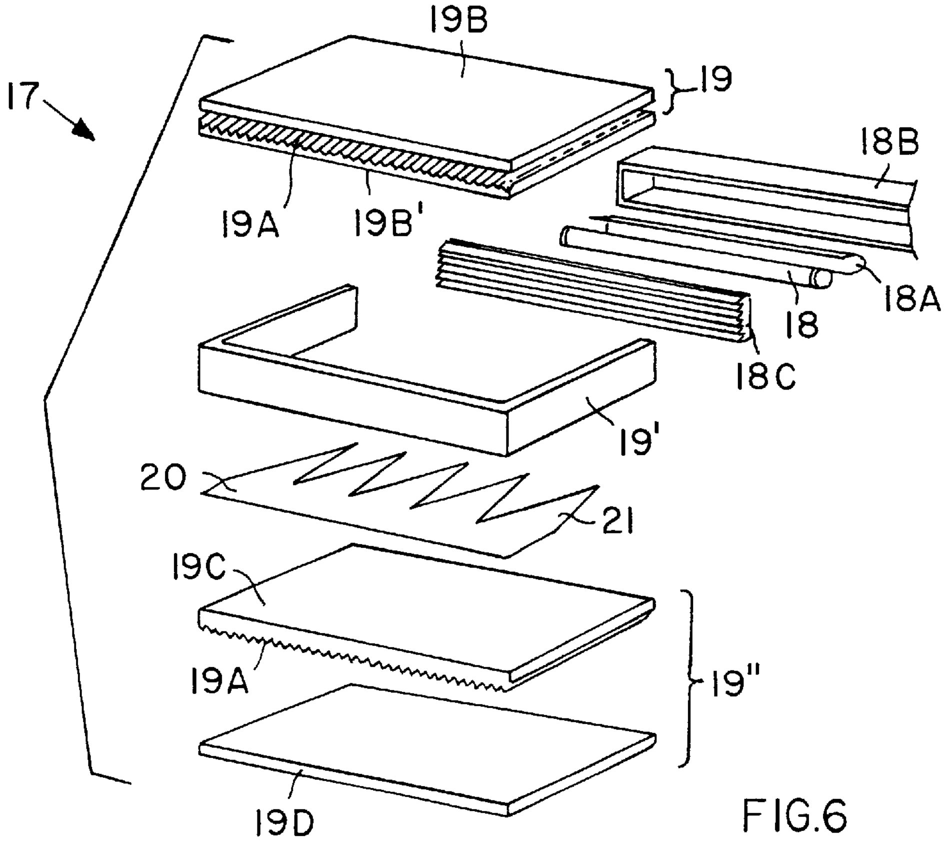
FIG. 6 illustrates an exploded perspective view of a hollow light guide in the form of a light box with a light extractor film.

FIG. 6 illustrates in an exploded view the components of a light decoupling light box 17 forming a hollow light guide box and employing a longitudinal light source 18 such as a fluorescent light tube. The tube 18 and a reflector 18A are mounted in their own housing 18B provided with a diffuser 18C forming a light inlet into the hollow box 17 formed by a top wall 19, by preferably opaque side walls 19', and by a bottom wall 19". In the assembled state the diffuser 18C forms one side wall of the box 17. The upper box wall 19 has a diffuser 19A sandwiched between two wall panels 19B and 19B'. A light extractor film 20 or several such extractors 20 positioned side-by-side with their extractor tips 21 pointing toward the light source 18 are sandwiched between the upper wall 19 and the lower wall 19" to assure a uniform light distribution as explained above. The lower wall 19" of the box has an upper wall panel 19C with an integral diffuser 19A facing an outer wall panel 19D. The upper wall panel 19B' is transparent. The panel 19B is either transparent or opaque. If the panel 19B is transparent, light will be uniformly emitted up and down or in opposite directions. If the panel 19B is opaque light will be emitted only downwardly.

Figure 11:
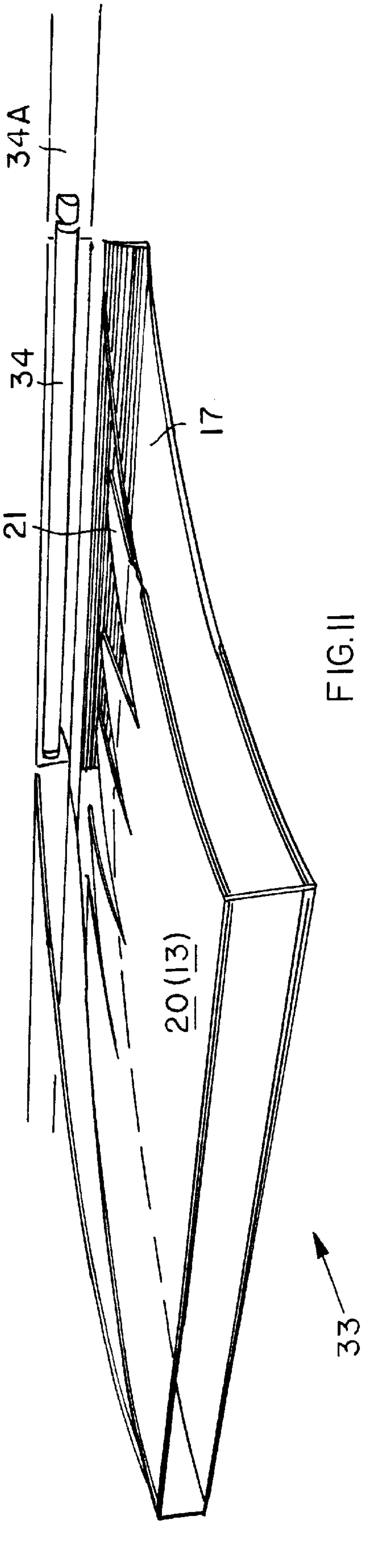
FIG. 11 shows a hollow light guide as a perspective view of a light box forming a ceiling panel.

The hollow light box 17 of FIG. 6 is also shown in FIG. 11 as a ceiling light fixture 33. Such a light box can be used for various purposes such as illuminating entire wall sections in which one of the walls 19 or 19" may be opaque. However, both walls may be transparent. Advertising panels and information display panels may be formed in this manner.

Figure 7:
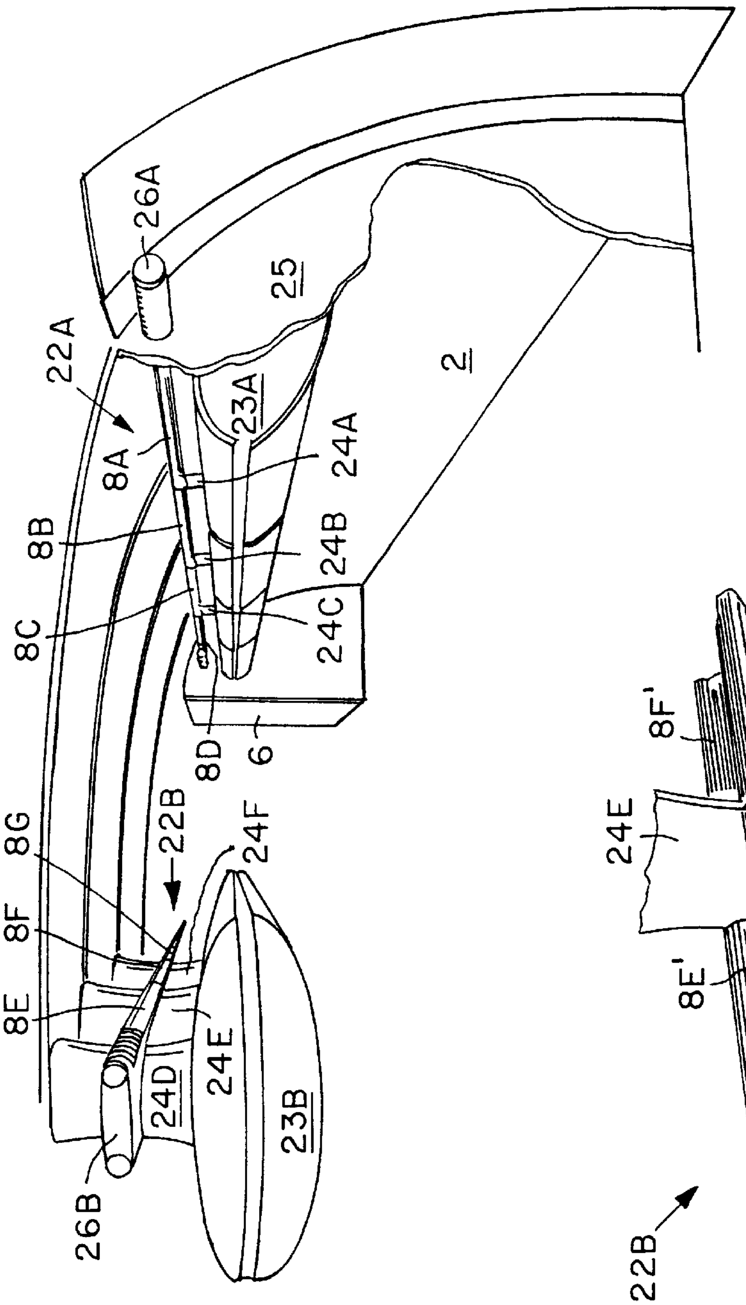
FIGS. 7 and 8 show perspective views of hollow light guides forming ceiling lights arranged above the luggage compartments in an aircraft cabin.

FIG. 7 shows a perspective view of a portion of a cabin section 2. A hollow light guide 22A is arranged along and above the lateral luggage compartments 23A positioned in a transition area between the ceiling and the aircraft side wall. A further hollow light guide 22B is arranged along the ceiling above the central luggage compartments 23B. The light guide 22A comprises a plurality of light guide sections 8A, 8B, 8C and 8D. The light guide 22B also comprises a plurality of light guide sections, namely 8E, 8F, and 8G. The mounting of the light guide sections is, for example, accomplished by mounting struts or studs 24A to 24F with connector elements which are known as such and hence not shown. These struts or studs 24A to 24F may simultaneously be used for the mounting of the lateral luggage compartments 23A and the central luggage compartments 23B.

One end of the hollow light guide 22A, or rather of its section 8D ends in a fixed installation 6 of the cabin 2 while the other end of the light guide, namely the end of light guide section 8A, ends in a separation wall 25. On the other hand, the light guide 22B above the central luggage compartments 23B is installed independently of any fixed installation components of the cabin 2 with the help of the studs or struts 24D, 24E, and 24F. A light source or generator 26A radiates light into the light guide 22A. Similarly, a light source or generator 26B radiates light into the light guide 22B. If required for providing a sufficient light output, additional light sources 26A and 26B may be arranged at the opposite end of the light guides 22A and 22B. One such light source may, for example, be mounted inside the fixed installation 6. Whether one or two light sources will be used depends on the length of the particular cabin section and on the required light intensity or illumination level in the particular cabin section.

Figure 8:
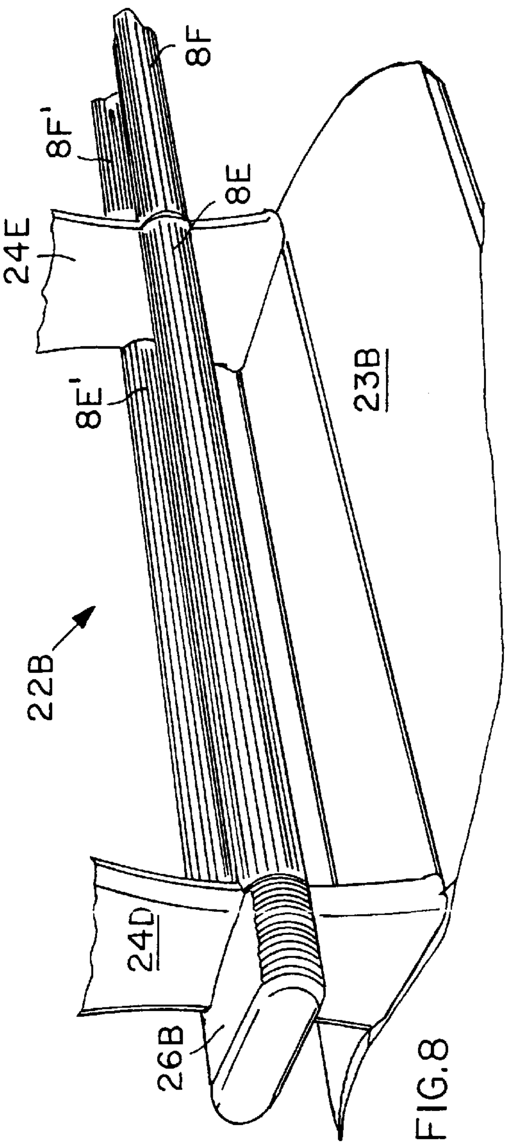

FIG. 8 illustrates a viewer facing portion of the light guide 22B on a somewhat larger scale in its arrangement above the central luggage compartments 23B. The light guide 22B has actually two parallel light guides with light guide sections 8E, 8F and 8E', 8F'. The light source 26B is preferably a twin source with two parallel arranged light sources one feeding light into the light guides 8E and 8F and the other feeding light into the light guides 8E' and 8F'. Further light sources may be arranged in the stud 24E and so forth, if necessary for achieving a uniform general illumination at the required level.

Figure 9:
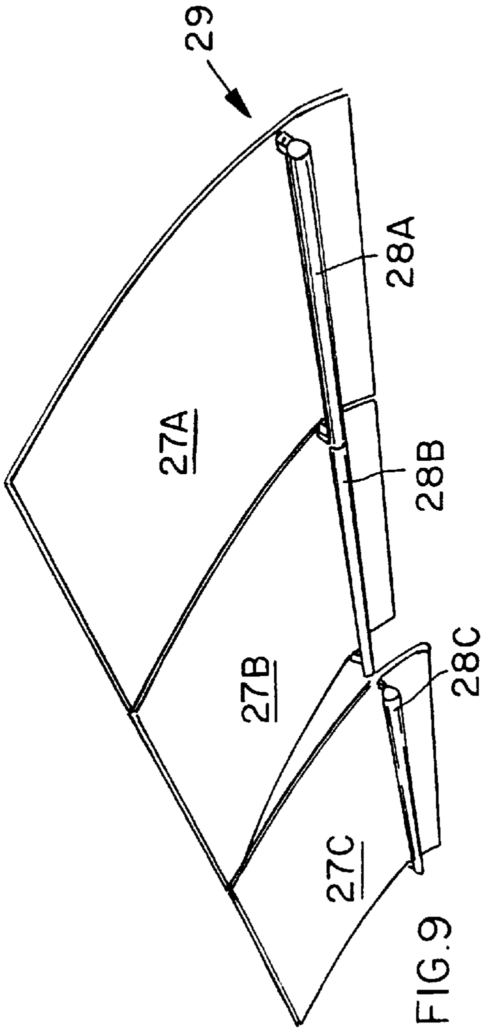
FIGS. 9 and 10 show perspective views of hollow light guide arrangements in the ceiling area of an aircraft cabin.

FIG. 9 illustrates perspectively a row 29 of a plurality of ceiling panels 27A, 27B, 27C, each illuminated by a respective hollow light guide section 28A, 28B, 28C. Preferably, the light guide sections are arranged in longitudinal alignment with each other so that in the assembled and mounted state there is a minimal gap between neighboring ends of the light guide sections facing each other and so that a light source in a cabin component such as a bulkhead can radiate its light into the aligned hollow light guide sections. An interconnection of the individual light guide sections 28A, 28B, 28C is normally not necessary. Light passing through these sections will also pass through the gap between sections into the neighboring light guide section. This type of arrangement is normally sufficient to illuminate the respective ceiling panels, all of which can thus be illuminated by a remotely positioned light source, thereby minimizing the mounting effort and expense for the cabin lighting system. This feature of the invention has the further advantage that the space between the aircraft frame structure and the ceiling panels no longer needs to be constructed for taking up energy supply components such as electrical cables for conventional light sources nor any light sources themselves. The light sources may be arranged as mentioned in separation walls and/or fixed installation columns 6, bulkheads or the like. This type of mounting of the light guide sections 28A, . . . also facilitates a rearrangement of the light guide sections relative to the individual ceiling panels, whereby the aircraft manufacturer gains substantial freedom in accommodating the wishes of different customers at an economic effort and expense for changes in the layout that can be rapidly made with the present system.

Figure 10:
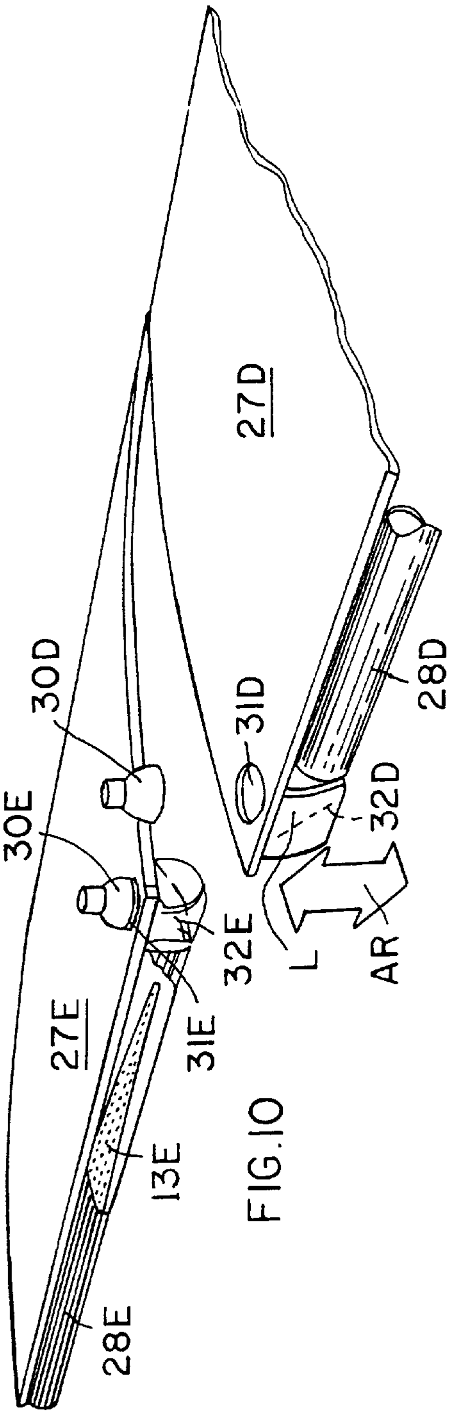

FIG. 10 shows another embodiment of the present illumination system for a cabin ceiling wherein ceiling panels 27E and 27D are equipped with hollow light guides 28E and 28D mounted alongside a longitudinal edge of the respective panel. Each of the light guides 28E, 28D is provided with a light decoupling or extracting film 13E, however, the film is only shown for the light guide 28E by the extraction film 13E. The light is emitted into the cabin area. More light is radiated out of the light guides 28E, 28D, for example to properly illuminate an aisle. For this reason and in order to assure a uniform illumination, a plurality of light sources are preferably combined with the light guides. Specifically, more light sources may be used in the arrangement of FIG. 10 along a given length than in the arrangement of FIGS. 7, 8, and 9 wherein the light sources are mounted either in a fixed cabin component 6 or in a cabin section divider wall 25. It may be more economical to provide light sources in the ceiling as shown in FIG. 10 than in fixed cabin components as illustrated in FIGS. 7 and 8, if more light sources are required for each determined cabin length. Thus, in FIG. 10 the light sources 30D and 30E are installed in the ceiling (not shown) so that each light guide 28D, 28E has its own light source. For this purpose the ceiling panels 27D, 27E are provided with respective holes 31D and 31E through which light can pass. In such an arrangement the light radiates in a direction perpendicularly to the longitudinal axis of the respective light guide 28E, 28D. In order to reflect the light into the direction of the longitudinal light guide axis, prismatic mirrors 32D, 32E are positioned at the entrance end of each light guide. The arrangement shown in FIG. 10 is particularly advantageous with regard to the installation or replacement of the ceiling panels 27D, 27E, which can be done without disturbing the light sources 30D, 30E and their wiring installed in the ceiling independently of the ceiling panels. A panel only needs to be tilted downwardly for removal and upwardly for reinsertion as shown by the arrow AR in FIG. 10. Thus, maintenance and initial installation work for panels and light sources is greatly facilitated.

FIG. 11 shows a ceiling panel 33 constructed in the hollow manner of the light box 17 shown in FIG. 6. An elongated light tube such as a fluorescent tube 34 is advantageously secured to the aircraft structure 34A and feeds its light into the light box 17. Instead of a fluorescent light tube, the light source 34 can be provided in the form of light guides as shown in FIGS. 4 and 5, whereby the light of a point type light source is first transmitted through the light guide and then decoupled by a transmission right angle film into the light guide box 17 for further distribution as described. The box 17 is again equipped with an extractor 20 comprising reflection films 13 pointing with their tips 21 toward the light source. The light distribution can be modified by a different arrangement of the extractor 20. This feature can thus be used for planning the layout and illumination of the aircraft cabin. Such planning will take into account that close to the light source a high light volume is available and that the light intensity diminishes further away from the light source so that the total surface area of the reflection film must be increased further away from the light source for achieving the desired decoupling or extraction of light. Using the light guide box 17 for other purposes than a ceiling panel 33, is also possible, for example, as part of a wall paneling or as part of a cabin divider wall, whereby decorative, display, and advertising considerations may be taken into account.

Figures 12, 12A:
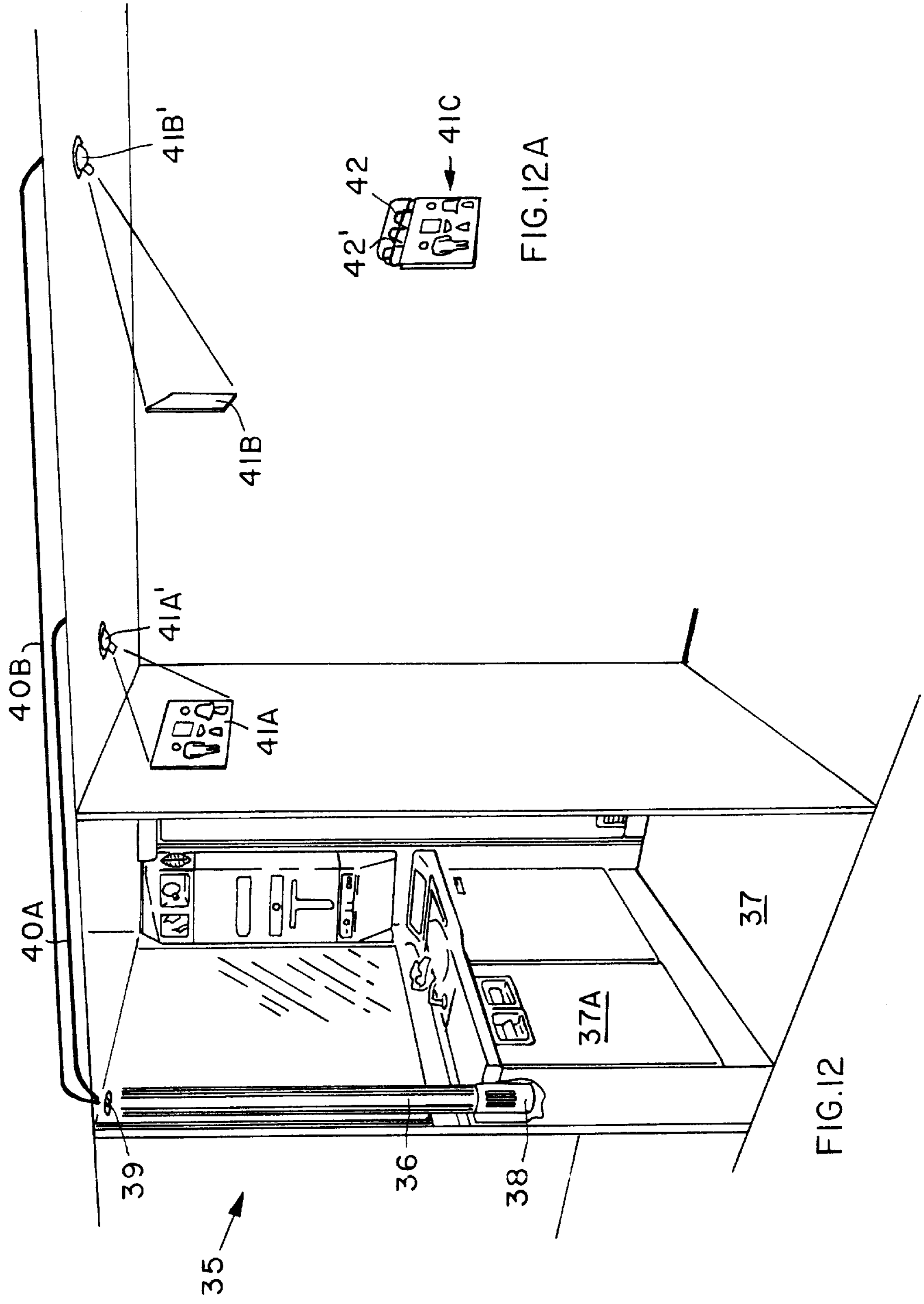
FIGS. 12 and 12A show the illumination of an aircraft toilet with a hollow light guide feeding light from a light source into several fiber optical conductors for illuminating information display panels.

FIG. 12 illustrates a lighting system 35 that illuminates with a single light source 38 a toilet 37 and information display panels 41A, 41B. FIG. 12A illustrates the introduction of light into a display panel 41C while in FIG. 12 the panels 41A, 41B are illuminated by floodlighting. A light source 38 is installed in a toilet cabinet 37A. The light from the light source 38 is supplied into a hollow light guide 36 which can be additionally equipped with transmission right angle film as described. The end of the light guide 36 remote from the light source 38 feeds remaining light into a lens or prism system 39 which in turn feeds light into one or more light conductor fiber bundles 40A, 40B the light of which is used to illuminate information panels 41A, 41B which in FIG. 12 are illuminated through lens systems 41A' and 41B' respectively to provide a floodlight type illumination. In FIG. 12A light conductors 42 lead over the edge 42' of the panel 41C to feed light into the back of the panel 41C.

Figures 13, 14, 15:
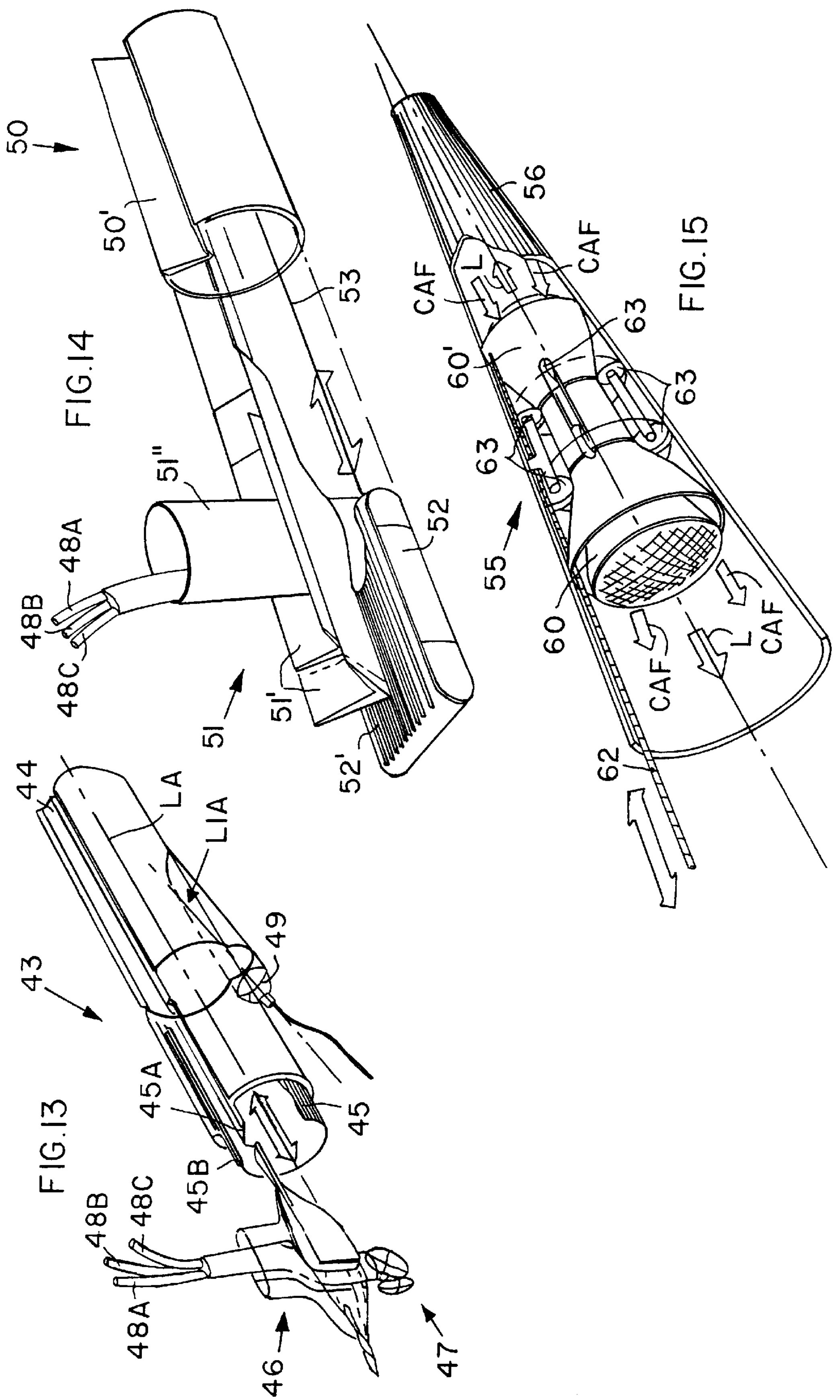
FIG. 13 illustrates a perspective view of a hollow light guide with a light decoupling device that is axially adjustable in its position along the length of the hollow light guide.
FIG. 14 is a perspective view of an air distribution channel forming a housing for a light source that is axially displaceable along the length of the air distribution channel.
FIGS. 15 and 16 show perspective views of tubular hollow light guides with axially movable light sources mounted directly in the hollow light guides.

FIGS. 13 and 14 illustrate lighting devices according to the invention in which decoupling components 46, S1 are axially adjustable in their position relative to the respective light guide 43 in FIG. 13 or relative to an air supply channel 50 in FIG. 14. With this arrangement it is possible to adjust the individual lighting for each seat in accordance with seat rearrangements when a cabin section is converted from one class to another, for example. This feature of the invention permits a rearrangement of the seats or rows of seats without much effort and expense since the light decoupling components have an adjustment range adapted to the rearrangement of seats.

Referring to FIG. 13 the specially constructed hollow light guide 43 has a longitudinal slot 44 covered by an optical lighting film 45 so arranged that the longitudinal edges 45A and 45B of the lighting film 45 overlap each other to close the gap 44. A slide 46 is movable along the slot 44. The slide 46 forms a movable support for a lens system 47 needed for light retrieval or decoupling in different positions of the slide 46 along the light guide 43. The light extractor slide 46 is guided in such a way that in any position that the slide can assume, the overlapping edges 45A and 45B spread sufficiently apart to let the slide 46 either pass or be positioned in a location desired for light extraction. Outside the position of the slide 46 the film edges 45A and 45B again overlap. These edges are sufficiently flexible for this purpose. The slide 46 carries in addition to the decoupling lens 47, fiber optic cables or light conductors 48A, 48B, and 48C. The lenses 47 feed light from the light guide 43 into the fiber optical conductors 48A, 48B, 48C which, for example supply light to individual reading lamps in or above passenger seats within the cabin. Preferably, flexible fiber optical conductors are used for this purpose so that even larger spacings between the light retrieving slide 46 and a reading lamp can be bridged. It is advantageous in connection with such a flexible light decoupling, that at certain intervals light sources 49 are incorporated into the hollow light guide 43. These light sources 49 supply light into the light guide 43 as required and are thus positioned in those locations where a sufficient light volume or illumination is no longer possible from the preceding light source. Preferably, the light sources 49 are evenly spaced from one another in the longitudinal direction and in a position opposite to the slot 44. The coupling or injecting of light into the light guide 43 can take place by respective optical elements which are arranged with an acute light injection angle LIA so that the feeding of light into the light guide 43 takes place almost parallel to the longitudinal axis LA of the light guide 43. By making the light injection angle LIA as acute as possible relative to the longitudinal axis LA of the light guide 43, it is assured that the entering light that impinges on the optical lighting film 45 within the light guide 43 at an angle which is acute enough to assure total reflection.

FIG. 14 illustrates a light generator 51 installed in hollow air supply channel 50 in which the light generator 51 is also axially adjustable in its position. The position adjustable light source or light generator 51 is movable within the channel 50 in the same manner as conventional air outlets. For this purpose the air channel 50 has a slot 50' along which the light generator 51 is movable with its guide plates 51' forming a slide or movable support for the light source or light generator 51. The slot 50 is closed by the flexible lips that permit the movement of the guide plates 51'. The guide plates 51' are secured to a tubular member 51" through which light conductor fibers 48A, 48B, 48C extend to supply the light from a light source 52 which is part of the light generator 51, for example, to individual reading lamps for seats in the aircraft. The construction of FIG. 14 has the advantage that the light source 52 is cooled by the air flowing through the air supply channel 50. Power is supplied to the light source 52 through sliding contact rails 53 extending longitudinally inside the air supply channel 50. Thus, the light generator 51 with its light source 52 is movable back and forth as indicated by the arrow along the air supply channel 50. The light source 52 is so dimensioned that there remains sufficient cross-sectional flow area in the channel 50 for the air flow. The cooling of the light source 52 is enhanced by ribs 52' forming part of the light generator slide or movable support.

Figures 16, 17:
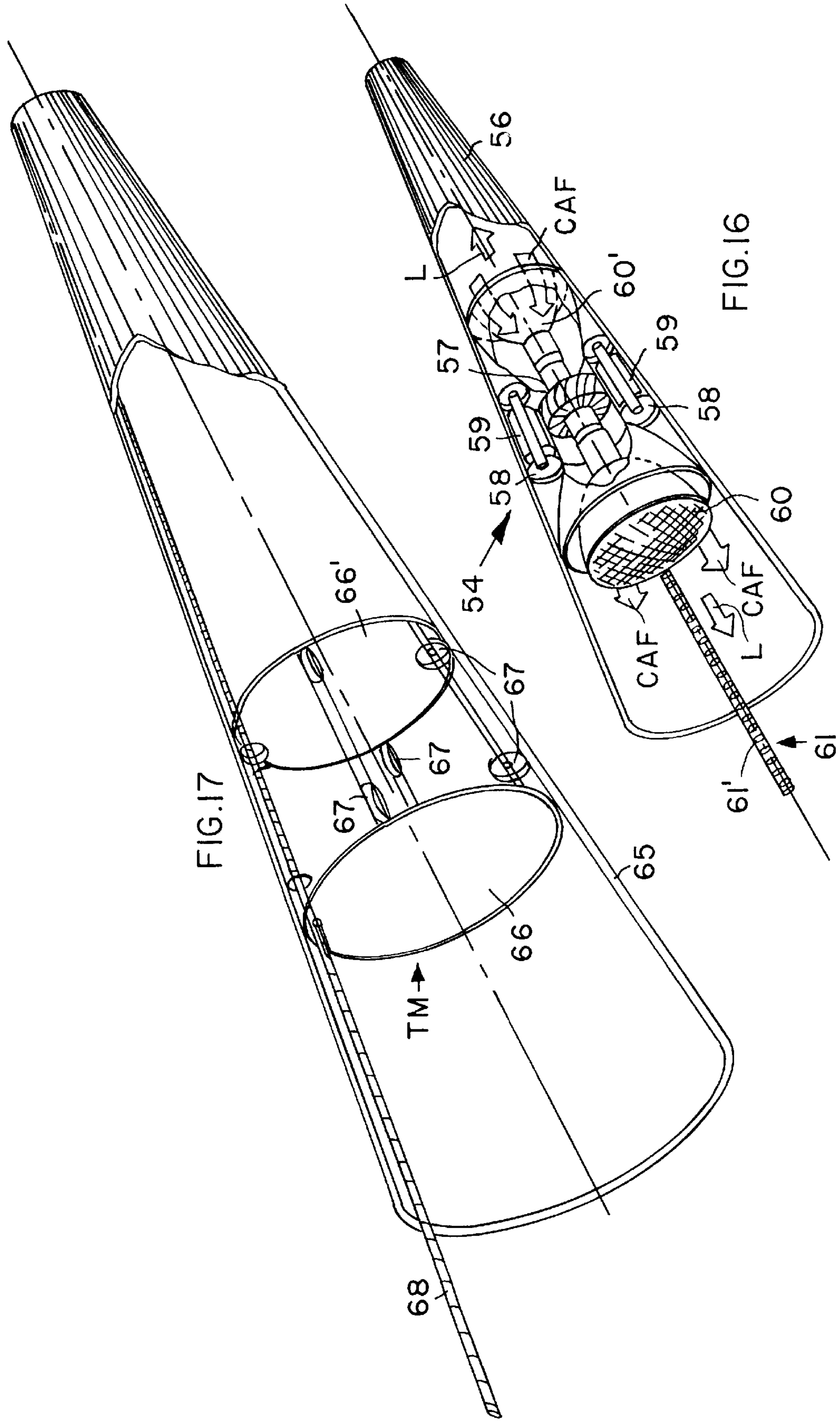
FIG. 17 is a perspective view of a tubular hollow light guide with reflector mirrors axially movable in the light guide.

FIGS. 15 and 16 show further embodiments for the arrangement of light sources 55, 54 in light guides 56. FIGS. 15 and 16 show embodiments of the invention wherein light sources 55, 54 are movably mounted in hollow light guides 56. Movable light sources are advantageous for individually controlling the light supply in individual cabin sections by moving the light sources to positions where most light is required for example when the seating structure is to be rearranged in the cabin or cabin sections. Especially in the embodiments shown in FIGS. 1, 7, 8, and 9, it is suitable to incorporate into the light guides 8 mobile light sources 54 or 55 to be described in more detail below. Such mobile light sources are also advantageous where, due to the cabin layout, the positioning of fixed light sources is more difficult. Similarly, mobile light sources greatly facilitate individually controlling the illumination of cabin sections which otherwise could be controlled only as a unit rather than individually. For purposes of controlling the illumination individually in different cabin zones independently of any control of other cabin zones, the power driven mobile light source 54 in FIG. 16 or the light source 55 moved by a cable drive 62 in FIG. 15 can be positioned within the respective light guide 56 wherever the individualized control is necessary. Even a plurality of mobile or movable light sources 55 or 54 can be arranged in these light guides 56. By moving the mobile light sources in the respective light guide, the spacing between light sources in the same light guide 56 can be changed to thereby increase the light volume and thus the illumination intensity. The closer two neighboring light sources are spaced from each other, the more light can be radiated from the respective light guide. Similarly, if the spacing between neighboring light sources is increased, the illumination intensity decreases. Where necessary, for example, where different spacings between neighboring light sources become necessary, for example, due to the cabin layout the light source may be equipped with a dimmer for providing these illumination intensity differences or for even increasing these illumination intensity differences where needed in different cabin sections or cabin zones.

FIG. 15 illustrates a twin light source 55 having two lightbulbs 60 and 60', for example gas discharge lamps radiating their light L in opposite directions. Preferably, a cooling air flow CAF is maintained during operation of the light sources by a blower 57 shown in FIG. 15 positioned to feed cooling air into the hollow light guide 56. The cooling air flow CAF moves through the mobile twin light sources 60, 60' in one direction but the light L is radiated in opposite directions into the respective light guide 56. As shown in FIG. 16 a blower 57 is preferably combined with the light sources and positioned between the two gas discharge lamps 60 and 60' forming a pair. The ends of the light guides 56 are left open to advantageously circulate the cooling air flow CAF.

The movement of the light source 55 in FIG. 15 is accomplished with a pulley system 62, the pulleys of which are arranged at the ends of the hollow light guide and the ropes or cables of which run through the light guide as shown. The light sources are equipped with running wheels 63 that run along the inner surface of the light guide 56 and form a movable support for the light source 55. The energy supply for the light sources can, for example, be accomplished by using electrical conductors as the pulley cable 62, whereby these cables 62 serve a dual purpose.

FIG. 16 shows a modification compared to FIG. 15 in that the light source 54 also comprising two gas discharge lamps 60 and 60' is equipped with motors 59 that drive the rollers 58 for moving the light sources 60, 60' back and forth in the light guide 56. The cooling of the gas discharge lamps is accomplished by the blower 57, as mentioned. The rollers 58 form a movable support for the light sources or lamps 60, 60' and for the blower 57. The rollers 58 in FIG. 16 also bear radially against the inner surface of the respective light guide 56. Power supply sliding rails 61 are provided in the light guide 56 preferably along a side facing away from the cabin interior and thus from passengers. Sliding contact wires are arranged in the rail 61 which is also preferably provided with magnetic positional indicators 61' indicating to an operator on a display panel the position of any particular light source relative to a cabin layout and for enabling an operator to move the light source to a position where it is needed. FIG. 17 shows a perspective view of a light guide 65 equipped with an axially movable twin mirror TM comprising two mirror disks 66 and 66' equipped with rollers 67 bearing radially against the inner wall of the light guide 65. The rollers 67 are interconnected to form a carriage or movable support for both mirrors which thus can be moved back and forth by a pulley system 68. The light sources are not shown in FIG. 17, but are arranged at the end of the light guide 65. Here again it is possible to control the light output volume and thus the illumination intensity by repositioning the mirrors 66, 66' as needed.

Although the invention has been described with reference to specific example embodiments, it will be appreciated that it is intended to cover all modifications and equivalents within the scope of the appended claims.

What is claimed is:

1. An aircraft passenger cabin, comprising a lighting system including at least one light source and a plurality of tubular hollow light guide sections positioned to receive light from said at least one light source for distributing light in the passenger cabin, said tubular hollow light guide sections being arranged in a longitudinal row to form a longitudinal tubular hollow light guide column, and wherein said at least one light source is arranged at an end of at least one of said tubular hollow light guide sections for feeding light into said longitudinal row of tubular hollow light guide sections.

2. The aircraft passenger cabin of claim 1, further comprising at least one light decoupling device integrated into at least one of said tubular hollow light guide sections.

3. The aircraft passenger cabin of claim 1, wherein each of said tubular hollow light guide sections comprises a longitudinal prism (10) disposed inside said tubular hollow light guide sections for conducting light inside said tubular hollow light guide sections.

4. The aircraft passenger cabin of claim 3, further comprising at least one light reflection film (13) forming a light extractor (12) which deflects light in directions in which said longitudinal prism (10) is light transparent.

5. The aircraft passenger cabin of claim 2, wherein said decoupling device comprises transmission right angle film (14) which is applied to inner surface areas (15) of said tubular hollow light guide sections (8).

6. The aircraft passenger cabin of claim 2, wherein said decoupling device comprises light exit openings (16, 16') in said tubular hollow light guide sections, said decoupling device further comprising transmission right angle film (14) covering said light exit openings.

7. The aircraft passenger cabin of claim 1, further comprising a cabin ceiling and ceiling panels, and wherein said tubular hollow light guide sections (28A, . . . ) are secured to said ceiling panels to form a ceiling lighting arrangement.

8. The aircraft passenger cabin of claim 7, wherein said at least one light source (9) is mounted in a cabin fixture for supplying light into an end of said tubular hollow light guide column.

9. The aircraft passenger cabin of claim 7, wherein said at least one light source (30D) is mounted in said cabin ceiling for feeding light into said tubular hollow light guide sections.

10. The aircraft passenger cabin of claim 9, further comprising a hole (31D) in at least one ceiling panel of said ceiling panels, wherein light from said ceiling mounted light source (30D, 30E) passes through said hole (31D) perpendicularly to a longitudinal axis of a respective tubular hollow light guide section (28D), and further comprising a prismatic mirror (32E) for deflecting a light bean from said ceiling mounted light source (30D, 30E) into said respective tubular hollow light guide section (28D, 28E).

11. An aircraft passenger cabin, comprising a lighting system including at least one light source and a plurality of hollow light guide sections positioned to receive light from said at least one light source for distributing light in the passenger cabin, said hollow light guide sections being arranged in a longitudinal row to form a longitudinal hollow light guide column which receives light from said at least one light source, wherein at least one of said hollow light guide sections comprises a hollow light box (17), and wherein said hollow light box comprises a longitudinal light source (34) arranged along one side of said hollow light box (17), and further comprising a box cover (19) and a light extractor film (20) covering at least a portion of said box cover (19) of said hollow light box (17) for providing a surface area illumination.

12. The aircraft passenger cabin of claim 11, further comprising a cabin separation wall and a fixture in said cabin separation wall, wherein said at least one longitudinal light source is mounted in said fixture in said cabin separation wall.

13. The aircraft passenger cabin of claim 1, further comprising at least one optical fiber light conductor (40A, 40B, 42) and a coupler connecting said at least one optical fiber light conductor to at least one of said tubular hollow light guide sections.

14. The aircraft passenger cabin of claim 1, wherein at least one of said tubular hollow light guide sections (43) comprises a longitudinal slot (44) in its wall, said lighting system further comprising a light extraction slide (46) longitudinally movable in said at least one tubular hollow light guide section (43), said at least one tubular hollow light guide section further comprising optical light conductor film (45) covering an inner surface of said at least one tubular hollow light guide section (43), said optical light conductor film (45) having longitudinal margins (45A, 45B) overlapping each other, said margins being flexible for spreading apart when said light extraction slide (46) moves along said at least one tubular hollow light guide section (43).

15. The aircraft passenger cabin of claim 14, further comprising a lens device (47) carried by said light extraction slide (46) so that said lens device receives light in said at least one tubular hollow light guide section from said at least one light source, said lighting system further comprising at least one fiber optical light conductor (48A, . . . ) positioned to receive light from said lens device carried by said light extraction slide (46) for supplying light for illumination in said aircraft passenger cabin.

16.The aircraft passenger cabin of claim 1, further comprising an air supply channel (50), a movable support holding said at least one light source to form a movable light generator (51) movable back and forth inside said air supply channel (50), whereby said movable light generator is coolable by air flowing through said air supply channel.

17. The aircraft passenger cabin of claim 16, further comprising at least one fiber optical light conductor (48A, 48B, 48C), said at least one light source (52) feeding light into said at least one fiber optical light conductor through at least one of said tubular hollow light guide sections.

18. The aircraft passenger cabin of claim 1, wherein at least one of said tubular hollow light guide sections comprises a longitudinally slotted tubular hollow light guide section (43), and wherein said at least one light source comprises a movable support forming with said at least one light source a slide light generator axially slidable within said slotted tubular hollow light guide section (43) for axial back and forth movement in said slotted tubular hollow light guide section (43).

19. The aircraft passenger cabin of claim 1, wherein at least one of said tubular hollow light guide sections comprises a mobile mirror inside said at least one tubular hollow light guide section in which said mobile mirror is movable axially for deflecting light within said at least one tubular hollow light guide section (56).

20. The aircraft passenger cabin of claim 1, further comprising a pulley system for moving one of said at least one light source and a mirror lengthwise inside at least one of said tubular hollow light guide sections.

21. The aircraft passenger cabin of claim 1, further comprising a carriage (58) and a drive motor (59) for driving said carriage and for moving one of said at least one light source and a mirror lengthwise inside at least one of said tubular hollow light guide sections.

22. The aircraft passenger cabin of claim 18, comprising two light sources forming part of said slide light generator, said two light sources (60, 60') being arranged back-to-back in said slide light generator.

23. The aircraft passenger cabin of claim 18, further comprising a blower (57) as part of said slide light generator for cooling said slide light generator.

24. An aircraft passenger cabin, comprising a lighting system including at least one light source and a plurality of hollow light guide sections positioned to receive light from said at least one light source for distributing light in the passenger cabin, said hollow light guide sections being arranged in a longitudinal row to form a longitudinal hollow light guide column, that receives light from said at least one light source, wherein each of said hollow light guide sections comprises a longitudinal prism (10) disposed inside said hollow light guide sections for conducting light inside said hollow light guide sections.

* * * * *

UNITED STATES PATENT AND TRADEMARK OFFICE

CERTIFICATE OF CORRECTION

PATENT NO. : 5,921,670

DATED : July 13, 1999

INVENTOR(S) : Schumacher et al.

It is certified that error appears in the above-identified patent and that said Letters Patent is hereby corrected as shown below:

Col. 3, line 1, after "shows", insert --a perspective view of--; after "as" delete "a perspective view";
line 2: before "a" (first occurrence), delete "of";
line 33, after "The", delete "hollow";
line 34, after "the", insert --hollow--;;

Col. 7, line 7, before "manner", delete "hollow"; after "the" insert --hollow--;
line 50, before "are", replace "S1" by --51--.

Signed and Sealed this

First Day of February, 2000

*Attest:*

Q. TODD DICKINSON

*Attesting Officer*

*Acting Commissioner of Patents and Trademarks*